(12) United States Patent
Cheiky et al.

(10) Patent No.: US 7,029,792 B2
(45) Date of Patent: Apr. 18, 2006

(54) RECOMBINANT SEPARATOR

(75) Inventors: Michael Cheiky, Santa Barbara, CA (US); Wilson Hago, Ventura, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 0 days.

(21) Appl. No.: 10/831,397

(22) Filed: Apr. 23, 2004

(65) Prior Publication Data

US 2005/0191552 A1 Sep. 1, 2005

Related U.S. Application Data

(62) Division of application No. 09/839,276, filed on Apr. 19, 2001, now Pat. No. 6,733,920.

(51) Int. Cl.
*H01M 2/14* (2006.01)
*C08L 1/02* (2006.01)

(52) U.S. Cl. ................. 429/229; 429/142; 524/35; 524/13; 428/536

(58) Field of Classification Search ............. 429/218.1, 429/229, 301, 129, 142, 145, 146; 524/13, 524/35; 428/536, 537.1, 537.7
See application file for complete search history.

(56) References Cited

U.S. PATENT DOCUMENTS

| | | | | |
|---|---|---|---|---|
| 2,872,498 | A | * | 2/1959 | Granger ................. 429/145 |
| 3,980,497 | A | * | 9/1976 | Gillman et al. .......... 429/145 |
| 4,209,578 | A | * | 6/1980 | Balters ................... 429/206 |
| 4,919,865 | A | | 4/1990 | Nelson |
| 5,947,354 | A | | 9/1999 | Oxley et al. |
| 5,962,161 | A | | 10/1999 | Zucker |
| 6,051,335 | A | | 4/2000 | Dinh-Sybeldon et al. |
| 6,054,084 | A | | 4/2000 | Khavari |

* cited by examiner

*Primary Examiner*—Michael Barr
*Assistant Examiner*—Monique Wills
(74) *Attorney, Agent, or Firm*—Marvin E. Jacobs

(57) ABSTRACT

A heterogeneous, cellulose battery separator made of a mixture of cellulose and a polymer with hydrogen permeability for use in zinc-based batteries exhibiting increased hydrogen transport through the membrane while maintaining low electrical impedance and exhibiting resistance to zinc ion transport preventing zinc dendrite formation.

8 Claims, 4 Drawing Sheets

RECOMBINANT SEPARATOR

This application is a Divisional of Ser. No 09/839,276, filed Apr. 19, 2001, now U.S. Pat. No. 6,733,920.

TECHNICAL FIELD

This invention relates to a separator for an alkaline battery and, more particularly, this invention relates to a cellulosic separator for a secondary zinc ion battery such as a silver-zinc battery.

BACKGROUND OF THE INVENTION

Separators play a crucial role in alkaline batteries. They keep the positive and negative sides of the battery separate while letting certain ions go through and blocking others. The separator is a passive element that has to perform the same task unchanged for the life of the battery. Meanwhile, it must be able to withstand a strongly alkaline environment both at ambient and elevated temperatures. In addition, it must be capable of resisting oxidative attacks.

In an alkaline battery, a separator should conduct hydroxyl ions at a sufficiently rapid rate to meet the increasingly high current demands of modern electronics. Films of cellulose in the form of regenerated cellulose have been used since World War II as the separator of choice for this purpose because of its superior ability to conduct hydroxyl ions in strongly alkaline media. Its low electrical resistance of 10 milliohm-in$^2$ has also led to its favor for use in zinc-based batteries, such as silver-zinc, zinc-nickel, and zinc manganese dioxide batteries. Additionally, it acts as a physical barrier to migration of other ions in the battery, such as that of zincate ions and silver ions in a silver-zinc battery.

Despite its advantages as a battery separator, regenerated cellulose has some intrinsic limitations. During overcharge, an alkaline battery tends to break down water and evolve hydrogen in sufficient quantities as to materially affect the internal impedance of the battery. Unless this hydrogen is removed efficiently, a parasitic feedback results in which the battery continues to be overcharged with resultant pressure buildup and venting of hydrogen or catastrophic rupture of the battery case. Regenerated cellulose, however, exhibits one of the lowest hydrogen permeability coefficients of known polymers, reported in the *Polymer Handbook* as $2.044 \times 10^{-15}$ cm$^3$cm$^{-1}$s$^{-1}$Pa$^{-1}$.

DESCRIPTION OF THE PRIOR ART

Prior batteries incorporate in recombinant separators comprising porous melt-blown polymer fibers that incorporate surfactants or lubricants that facilitate gas transport within a battery. U.S. Pat. No. 6,054,084 describes separators for lead-acid batteries made of polytetrafluoroethylene (PTFE) fibril matrix incorporating particulate silica filler and non-evaporative lubricant as gas transport agents. Zucker in U.S. Pat. No. 5,962,161 describes a recombinant separator for lead-acid batteries that comprises melt-blown polypropylene made wettable by a surfactant agent thus enabling transport of oxygen.

In U.S. Pat. No. 4,919,865 Nelson teaches a method for making a composite membrane made from a mixture of polymethyl methacrylate and a cellulosic derivative, such as cellulose acetate. A gas stream containing hydrogen is selectively cleaned of the hydrogen by the presence of the methyl methacrylate. Polymethyl methacrylate is, however, unsuitable as a battery separator capable of handling high currents because of its high electrical resistance.

SUMMARY OF THE INVENTION

The separator provided by the present invention consists of a membrane having both high hydroxyl conductivity and high hydrogen transport. When the separator is placed in a silver-zinc battery, hydrogen buildup in the battery is diminished. The present invention relates to a recombinant separator that is able to transport hydrogen while conducting hydroxyl ions. The separator of the invention help maintain low electrical impedance and exhibit resistance against formation of zinc dendrites. A preferred battery separator according to the inventor contains a solution of cellulose having of a degree of polymerization between 200 and 1200 that is mixed with particles of a polymer having a hydrogen permeability greater than $1 \times 10^{-13}$ cm$^3$cm$^{-1}$s$^{-1}$Pa$^{-1}$. The resulting mixture is then coagulated under controlled environmental conditions to produce a heterogeneous gel that when dehydrated yields a membrane useful as a recombinant battery separator.

The separator of the present invention includes, but is not limited to: A secondary, zinc ion battery comprising in combination; a battery case containing; a body of alkaline electrolyte; a zinc electrode disposed in said body of electrolyte; a silver counter-electrode disposed in said body of electrolyte; and a cellulose separator film having a thickness from 10 microns to 250 microns, being resistant to alkaline electrolyte, being impermeable to zinc ions containing a continuous cellulose phase and a dispersion of discrete domains of polymer having a high hydrogen permeability of at least $1 \times 10^{-13}$ cm$^3$cm$^{-1}$s$^{-1}$Pa$^{-1}$, within said cellulose phase said film being impermeable to hydrogen except where said discrete polymer domains of high hydrogen permeability are present in said film in an amount of 10 to 60 parts by weight to 100 parts of the cellulose film, and said separator film is disposed in said body of electrolyte between said electrodes. The separator also includes: cellulose that is cross-linked with a hydrocarbon bridge containing from 2 to 12 carbon atoms between cellulose chains; where the bridge is an alkylene bridge containing from 4 to 8 carbon atoms; and a polymer in an amount of 10 to 60 parts by weight to 100 parts by weight of cellulose; where the polymer is selected from cellulose ether, alkyl cellulose or ethyl cellulose.

These and many other features and attendant advantages of the invention will become apparent as the invention becomes better understood by reference to the following detailed description when considered in conjunction with the accompanying drawings.

DETAILED DESCRIPTION OF THE INVENTION

The recombinant separator of the invention is formed of a mixture of a hydrophilic polymer, cellulose and hydrophobic agents. The hydrophilic polymers preferably have relatively high hydrogen permeability. The mixture is then coagulated under controlled conditions to yield a membrane that maintains the macroscopic properties of the two substituents.

Cellulose, with a degree of polymerization from 200 to 1200, in the form of, but not limited to, microcrystalline cellulose, cotton fiber, paper and microgranular cellulose, is dissolved using a variety of different solvents. These solvents include, but are not limited to, LiCl/DMAC, trifluoroacetic acid and N-morpholine N-oxide. The applicable range in the case of LiCl/DMAC solution for the percent weight of the solution of cellulose to the solvent is 1 to 11%. The cellulose may be crosslinked with standard methods and then dissolved. Suitably the cellulose is crosslinked with a hydrocarbon bridge containing from 2 to 12 carbon atoms, preferably an akylene bridge containing 4–8 carbon atoms.

A polymer having a hydrogen permeability greater than $1 \times 10^{-13}$ cm$^3$cm$^{-1}$s$^{-1}$Pa$^{-1}$ can include, but is not limited to, ethyl cellulose, polyphenyl oxide, polymethyl siloxane, cellulose acetate, and gutta percha. The polymer is dissolved in a solvent that is miscible with the solvent that dissolves the cellulose, and is added either concurrently or separately. Whether mixed concurrently or separately, a preferable concentration range of 2 to 10% weight of solvent is used.

A softener, such as glycerol or decane, may be added at this point, as long as it is soluble in the solvent. Hydrophilic fibers may also be added at this point.

The solution containing both cellulose and the high hydrogen permeability polymer is then cast into a film using a variety of techniques known to those skilled in the art of membrane fabrication. These techniques include extrusion of the solution onto a conveyor belt, casting onto a glass plate with a casting knife or casting onto a well-leveled glass plate.

An important aspect of the invention is that the controlled introduction of into the film or to the atmosphere above the solution in film form induces the formation of macroscopic domains and phase separation for both the hydrophobic and hydrophilic constituents in the cast solution. A properly formed-heterogeneous gel exhibits intertwined domains. These separate domains include one that is mostly the cellulose material and one that is mostly the hydrophobic agent. In the final film the hydrophobic regions are sufficiently large as to exhibit macroscopic transport characteristic of the bulk hydrophobic polymer.

Figure 1:
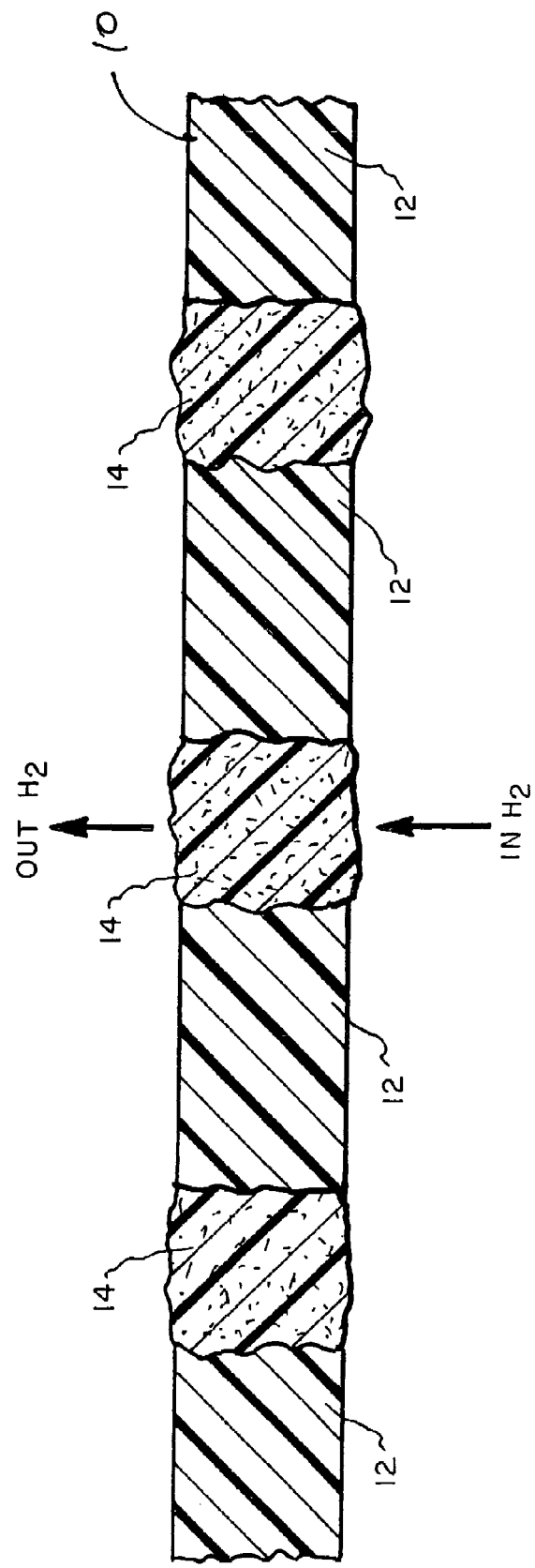
FIG. 1 is a schematic drawing of the heterogeneous recombinant separator of the invention.

A schematic representation is shown in FIG. 1 which illustrates a recombinant film 10 having a continuous cellulose phase 12 and discontinuous regions 14 that are permeable to hydrogen. It has been observed via local measurements that hydrogen readily permeates through the hydrophobic rich regions, but not the cellulose regions. Nevertheless, cellulose molecules surround the hydrophobic regions, giving the film the zinc dendrite resistance, mechanical strength and ionic conductivity required for high performance.

The rate of introduction of water to the cast mixture cannot be too slow or too fast. If it is too slow, no gel will form in a meaningful amount of time. If it is too fast, the gel formed will not be cohesive, and the film will not be strong.

The solution can be coagulated with conventional techniques, either be exposure to ambient moisture, exposure to an alcohol atmosphere or by direct application of a water stream or alcohol stream to the resulting solution. It has been observed that an ambient atmosphere having a relative humidity range of 35 to 80% at a temperature range of 15 to 30 degrees Celsius yields acceptable gels within a 1 to 3 hour range.

The coagulated cellulose material, in the form of a cohesive gel, is washed to remove the solvent and the salt. It is possible to employ alcohols mixed with water, but it is preferable that the percentage of alcohol be kept below a 50% volume ratio.

After thorough washing of the resulting gel, the gel may be dried with any conventional technique such as air drying, vacuum drying or press drying.

EXAMPLE 1

40 grams of microcrystalline cellulose (MCC, Aldrich 31,069-7) is placed in a solution of 2 kg of 5% LiCl/DMAC and heated to 120 degrees Celsius for 15 minutes. The cooled solution affords a clear solution of MCC. 5 grams of ethyl cellulose (EC) is dissolved in 100 ml DMAC separately. The MCC and EC solutions are combined in a 60/40 weight ratio by polymer weight. 40 ml of the combined solution is placed on a glass tray. Exposure to ambient moisture at 21 degrees Celsius at 55–60% relative humidity yields a cohesive gel in approximately 2 hours. This gel contains phases of MCC and EC. The gel is then washed with water repeatedly until all DMAC and LiCl are removed. The gel is then dried with a press-dry, affording a film useful as a separator.

The separator film is tested for hydrogen transport using an assembly containing a mass spectrometer. A cavity whose walls are made of a hydrogen impermeable material is filled with hydrogen on one side is capped with a separator film to form a tight seal around the cavity. A mass spectrometer equipped with an external probe is placed on the exposed part of the separator and the partial pressure of hydrogen is read after a suitable amount of time. Representative data after 1 minute follows:

| Membrane ID | Base H$_2$ pressure (×10e − 10 Torr) | Measured H$_2$ pressure (×10e − 10 Torr) |
| --- | --- | --- |
| Cellulose | 1.5 | 1.5 |
| Recombinant 685b | 1.5 | 20.9 |
| Recombinant 959c | 1.5 | 89 |

The separators were presoaked in 50% by weight KOH for 2 minutes and placed in the above apparatus. Similar differentiation in hydrogen transport properties was obtained between regenerated cellulose and recombinant separators.

The recombinant separators were placed in silver-zinc batteries with the result that the batteries were fast charged, and their impedance was indistinguishable from regenerated cellulose.

Figure 2:
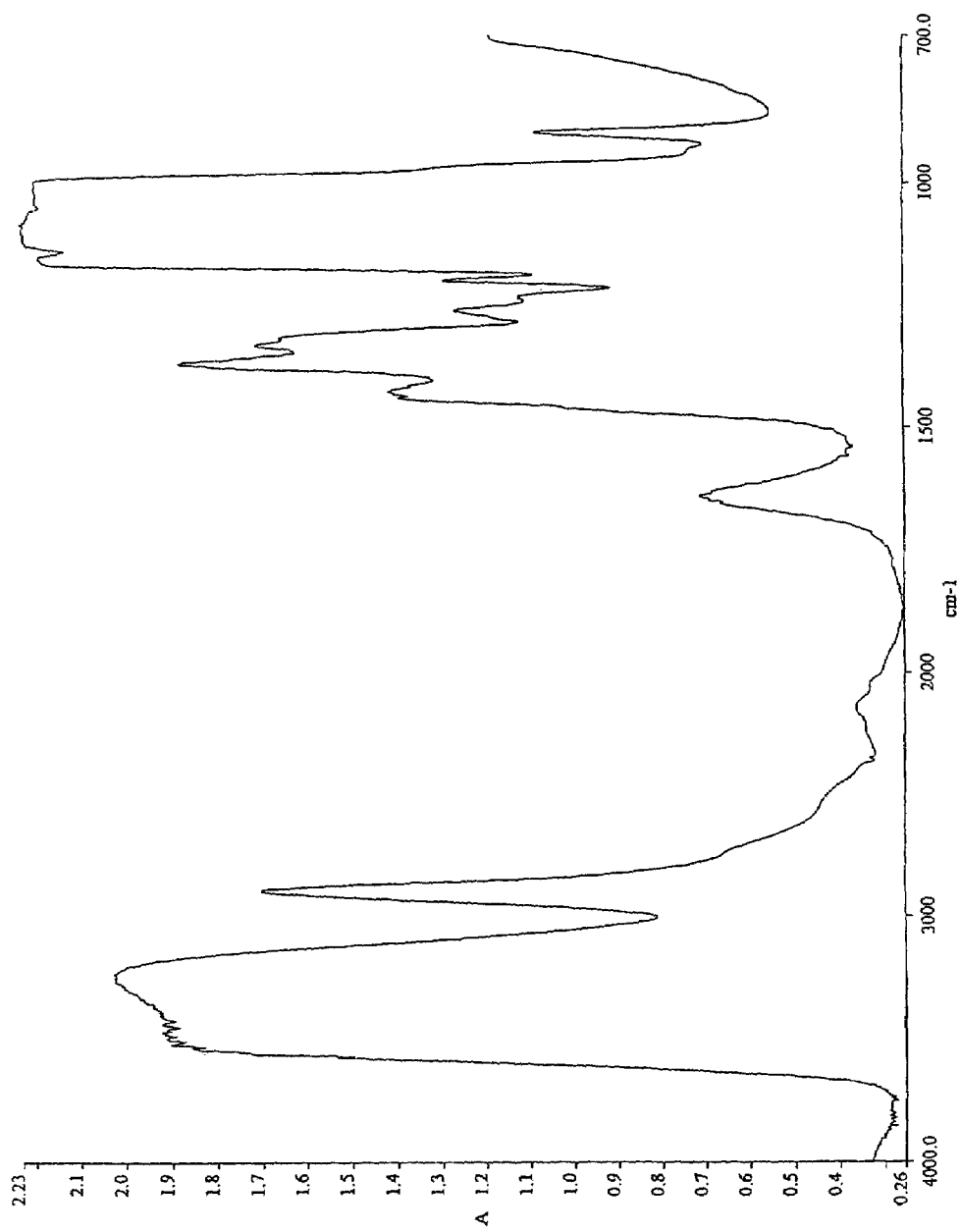
FIG. 2 is a spectra of cellulose.
Figure 3:
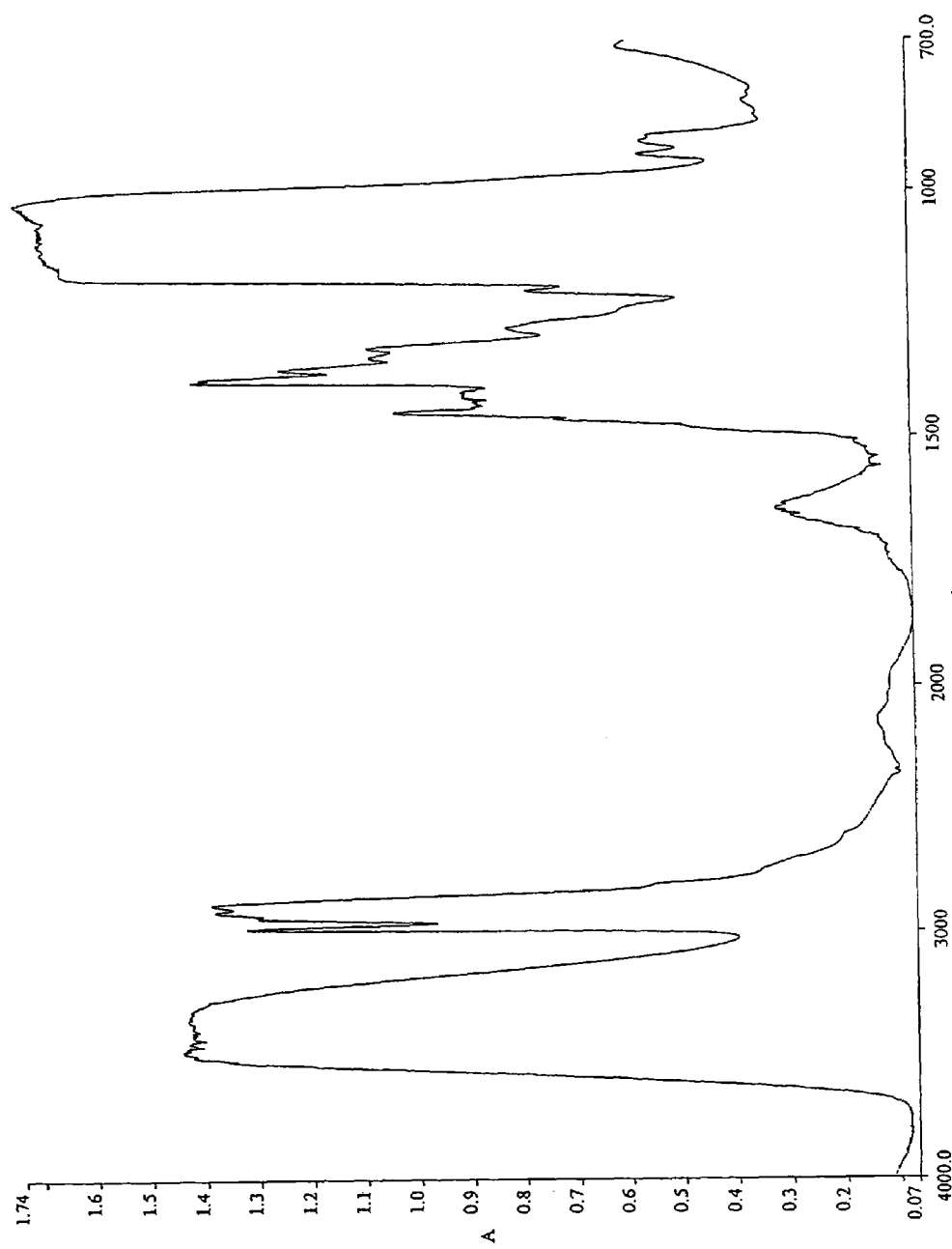
FIG. 3 is a spectra of ethyl cellulose.
Figure 4:
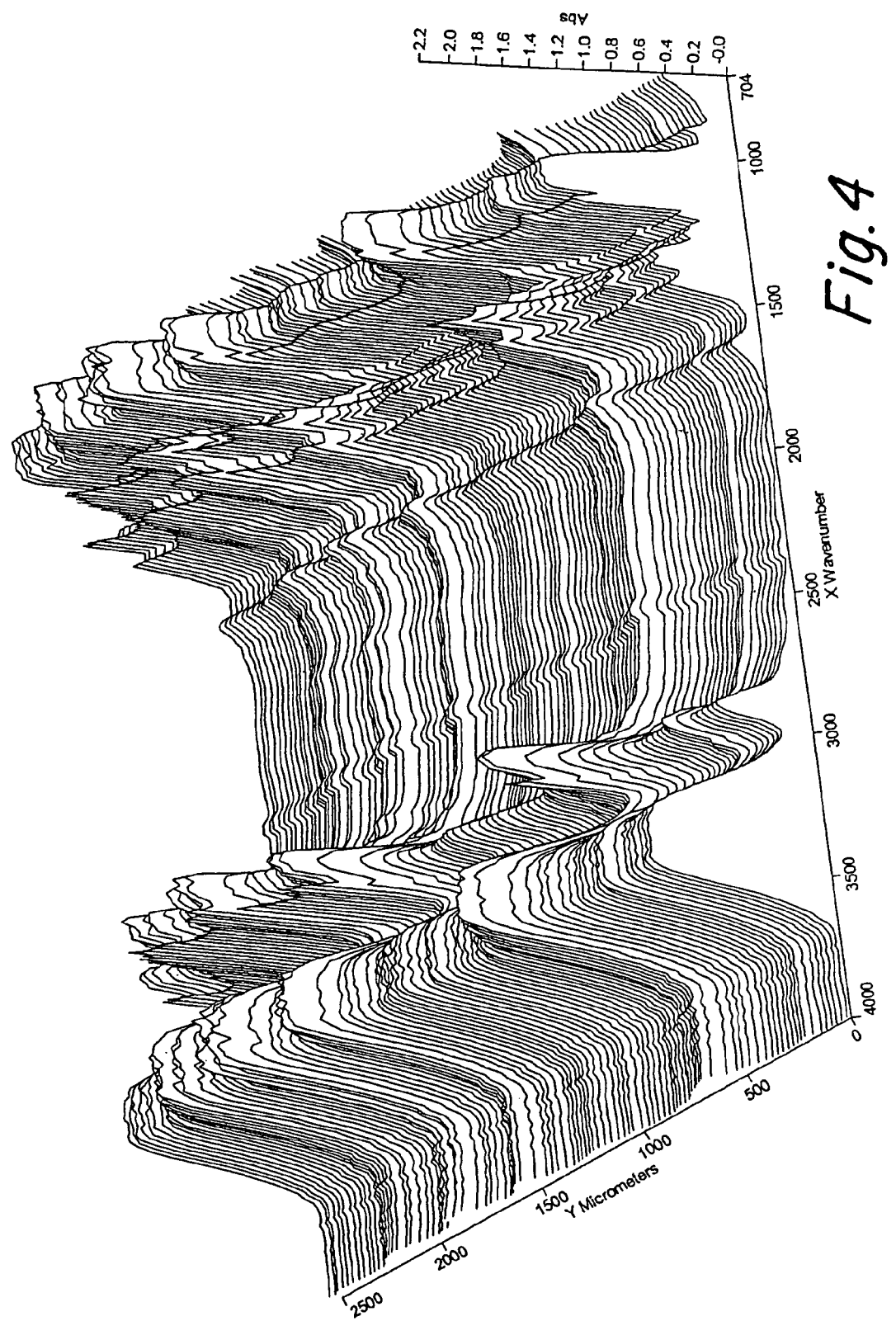
FIG. 4 is a line scan view of the separator of the invention.

Further confirmation of phase separation was obtained by performing a scanning reflective Fourier Transform Infrared spectrograms of the film surface over a region 2500 microns in length. A Perkin Elmer Autoimage FTIR microscope was used to collect the data. For illustrative purposes a scan of plain cellulose and of plain ethyl cellulose is shown in FIGS. 2 and 3, respectively. The most obvious differentiation between the two spectra is the presence of a peak at 2970 cm$^{-1}$ in the EC spectrum corresponding to a C—H stretch of the ethyl group. FIG. 4 shows a plot of 100 IR scans where each scan is taken every 25 microns along a particular direction. It is observed from the spectra that agglomerated regions of EC are juxtaposed to regions that are comprised mostly of cellulose.

Furthermore, a microprobe attached to a mass spectrometer as described above, when placed on the ethyl cellulose-rich regions, detected transport of hydrogen through these regions, whereas the probe, when placed over a cellulose-rich region, failed to detect any passage of hydrogen.

EXAMPLE 2

20 g of microgranular cellulose (Aldrich C6413) is dissolved in 22 kg of 5% LiCl/DMAC and heated to 130 degrees Celsius for 1 hour. The solution is cooled and then mixed with 5% by weight EC in DMAC in a 60/40 weight ratio cellulose/EC. 45 g of solution is cast and gelled with a humidifier over the glass tray. A thermohygrometer close to the tray registered 20 degrees Celsius and 65% relative humidity. After 1 hour, a cohesive gel forms, which is then rinsed to yield a solvent and salt-free gel. The gel is dried under vacuum to yield a separator that is 75 microns in thickness.

EXAMPLE 3

20 g. cellulose of powder form (International Filler Corporation) of degree of polymerization 1200 is dissolved in 2 kg of 3% LiCl/DMAC. Cellulose is crosslinked by reacting with NaOH and 1,6 diiodohexane. The resulting cellulose solution is mixed with 4% polyphenyl oxide in DMAC and both solutions are heated to 70 degrees Celsius and then cooled. Solutions are cast onto a conveyor belt and allowed to gel on the conveyor belt. Gel is moved to a different section where it is washed and rinsed along another belt and then taken to a drying drum.

EXAMPLE 4

The procedure of example was repeated except washing was performed with 50% methanol, 50% water.

It is to be realized that only preferred embodiments of the invention have been described and that numerous substitutions, modifications and alterations are permissible without departing from the spirit and scope of the invention as defined in the following claims.

The invention claimed is:

1. A secondary, zinc ion battery comprising in combination;
    a battery case containing;
    a body of alkaline electrolyte;
    a zinc electrode disposed in said body of electrolyte;
    a counter-electrode disposed in said body of electrolyte; and
    a cellulose separator film having a thickness from 10 microns to 250 microns, being resistant to alkaline electrolyte, being impermeable to zinc ions containing a continuous cellulose phase and a dispersion of discrete domains of polymer having a high hydrogen permeability of at least $1\times10^{-13}$ cm$^3$ cm$^{-1}$ s$^{-1}$Pa$^{-1}$, within said cellulose phase said film being impermeable to hydrogen except where said discrete polymer domains of high hydrogen permeability are present in said film and said discrete domains of high hydrogen permeability polymer are present in said film in an amount of 10 to 60 parts by weight to 100 parts of the cellulose film, and said separator film is disposed in said body of electrolyte between said electrodes.

2. A battery according to claim 1 in which the cellulose is crosslinked with a hydrocarbon bridge containing from 2 to 12 carbon atoms between cellulose chains.

3. A battery according to claim 2 in which the bridge is an alkylene bridge containing from 4 to 8 carbon atoms.

4. A secondary zinc battery according to claim 1 in which the counter-electrode comprises silver.

5. A secondary zinc battery according to claim 1 in which the polymer is present in said separator in an amount of 10 to 60 parts by weight to 100 parts by weight of cellulose.

6. A secondary zinc battery according to claim 5 in which the polymer is cellulose ether.

7. A secondary battery according to claim 6 in which the polymer is alkyl cellulose.

8. A secondary battery according to claim 7 in which the polymer is ethyl cellulose.

* * * * *